United States Patent
Barrella et al.

[11] Patent Number: 5,962,162
[45] Date of Patent: Oct. 5, 1999

[54] LITHIUM ION POLYMER CELL SEPARATOR

[75] Inventors: Joseph N. Barrella, Irvington; Michael E. Manna, Waterloo, both of N.Y.

[73] Assignee: Ultralife Batteries Inc., Newark, N.Y.

[21] Appl. No.: 08/948,512

[22] Filed: Oct. 10, 1997

[51] Int. Cl.$^6$ ................................................. H01M 2/16
[52] U.S. Cl. ........................ 429/162; 429/247; 429/254; 429/231.4
[58] Field of Search .................... 429/162, 247, 429/249, 254, 231.4

[56] References Cited

U.S. PATENT DOCUMENTS

| | | | |
|---|---|---|---|
| 4,794,057 | 12/1988 | Griffin | 429/254 X |
| 5,176,968 | 1/1993 | Blasi et al. | 429/249 X |
| 5,180,647 | 1/1993 | Rowland et al. | 429/254 X |
| 5,460,904 | 10/1995 | Gozdz et al. | 429/162 X |
| 5,591,542 | 1/1997 | Sakamoto et al. | 429/249 |

FOREIGN PATENT DOCUMENTS

| | | | |
|---|---|---|---|
| 61-8854 | 1/1986 | Japan | 429/249 |

*Primary Examiner*—Stephen Kalafut
*Attorney, Agent, or Firm*—Graham & James LLP

[57] ABSTRACT

A lithium ion cell with a polymeric anode and cathode and a separator therebetween. The separator, such as of non-woven polymeric fibers is provided with its own discrete structure, without carrier substrate, and with structural integrity, apart from being laminated/compressed between the polymeric anode and cathode elements. Operable cells are made thinner despite the self supporting discrete structure, with obtained improved rate capacity and high temperature performance.

5 Claims, 1 Drawing Sheet

LITHIUM ION POLYMER CELL SEPARATOR

FIELD OF THE INVENTION

This invention relates to separators used in thin laminated electrochemical cells and particularly to separators used in lithium ion polymer cells.

BACKGROUND OF THE INVENTION

In polymer type cells the individual cells are typically constructed with the cathode and anode materials being laminated to opposite sides of a thin solid polymer electrolyte separator membrane, with respective electrically conductive current collectors being placed adjacent to or within the anode and cathode. The anode, cathode, current collectors and separator together with electrolyte comprise the individual cell assembly which is typically placed into a metallized plastic laminate which is sealed under heat and pressure to form a completed sealed cell, with the respective current collectors remaining electrically externally accessible. The respective layers of the electrodes and electrolyte separator are very thin, generally on the order of 5–6 mils for the anode, 9–12 mils for the cathode and 3–9 mils for the polymer electrolyte/separator, with a total cell thickness of about 18–25 mils.

In the past, in such polymeric cells, the polymeric materials of the electrodes and separator have been of the same or very similar material. The cells were made with a lamination compression of the thin separator between the electrodes to enhance interface contact by means of a common material interface. The enhanced interfacial contact was deemed necessary to provide for sufficient ion transport capability through the separator to the electrodes, which ion transport had been minimized because of the low amounts of fluid electrolyte contained in polymer cells. Polymer cells contain all or nearly all of their electrolyte as absorbed within the electrodes and separator with little if any free liquid electrolyte. It was thus deemed necessary to provide a pressed laminate structure with all components having common polymeric components in order to provide the requisite interface for acceptable cell and battery performance. Accordingly, in polymer cells the separator was in the form of a thin membrane of the common polymeric material, having little structural integrity of its own. Accordingly the separator was required to be handled during cell and battery construction on a base substrate as a carrier until the separator was laminated with the electrodes, at which point the carrier substrate was removed.

However, despite the integration of anode, cathode and separator in polymer cells, as described, there were often fluctuations in cell performance in terms of cell rate, capacity and high temperature performance. This was in addition to the complications in manufacturing engendered by construction of such cells with component carrier substrates and the sensitivity of the material to mechanical handling.

By way of specific example, in a typical polymeric cell, the cell anode, cathode and separator are each comprised of a combination of a poly(vinylidene fluoride) (PVdF) copolymer matrix and a compatible organic plasticizer which maintains a homogeneous composition in the form of a film. In commercial embodiments, the separator copolymer composition comprises from about 75 to about 92% by weight of the poly(vinylidene fluoride) and about 8 to about 25% by weight hexafluoropropylene (HFP), (both commercially available from Elf AtoChem North America as Kynar FLEX™), and an organic plasticizer. The copolymer composition is also used as binder material in the manufacture of the respective electrodes to insure a compatible interface with the separator.

The most common organic plasticizer materials are the higher-boiling point plasticizers including dibutyl phthalate, dimethyl phthalate, diethyl phthalate and tris butoxyethyl phosphate. In addition, inorganic fillers such as fumed alumina and silanized fumed silica were often added to enhance the physical strength and melt viscosity of the separator membrane, and to increase the electrolyte solution absorption level.

Because of the requisite thin film nature of the separators they were commonly made by procedures involving casting or forming films in addition to the described use of substrate carried membranes of polymer compositions.

In a typical lithium ion polymer cell the cathode is generally made of the polymer used in the anode and separator, with an amount of lithium manganese oxide added to the mix in place of the graphite (used in the anode) as a host intercalation material for the lithium ions.

The current collectors which are assembled to be in intimate electrical contact with the cathode and the anode are usually made from aluminum and copper, respectively, and of foil or grid-like configuration.

To facilitate ionic conductivity and transport, the anode, cathode and separator (usually as a unit, after lamination and compresion) are made porous by solvent extraction of the plasticizer material such as DBP, which, after the extraction, leaves matrices or pores in the electrodes and separator. It is understood however, that this is merely an illustrative embodiment and that other methods of extraction are possible, as well as other methods for providing the requisite porosity. The porous electrodes and separator are dipped into the electrolyte, prior to cell packaging, in order to load the electrolyte into the cell. Free liquid electrolyte is minimized or eliminated thereby.

The electrolyte, which is added to the electrodes and separator is comprised of a solution of a soluble lithium salt in one or more organic solvents such as ethylene carbonate and dimethyl carbonate (EC-DMC). Other commonly utilized non-aqueous solvents include γ-butyrolactone (γ-BL), tetrahydrofuran (THF), 1,2-dimethoxyethane (1,2-DME), propylene carbonate (PC), diethyl carbonate (DEC), methyl ethyl carbonate (MEC), diethoxyethane (DEE), dioxolane (DOL) and methyl formate (MF).

Generally the soluble electrolyte is present in about 1 to 2 molar solutions and with preferred and common soluble electrolyte lithium salts being $LiPF_6$, $LiAsF_6$, $LiBF_4$, $LiClO_4$, $LiCF_3SO_3$, $LiN(CF_3SO_2)_3$, and $LiN(C_2F_5SO_2)_3$, with $LiPF_6$ being particularly preferred.

Electrodes, anodes and cathodes type, structure and method of construction of polymer type cells are known in the field (e.g., such as described in U.S. Pat. No. 5,296,318) with carbon anodes and spinel cathodes such as of $LiMn_2O_4$ and electrolyte containing separators, as described.

SUMMARY OF THE INVENTION

With the aforementioned background, it is an object of the present invention to enhance manufacturability of lithium ion polymer cells but without degradation of cell capacity and performance.

It is a further object of the present invention to provide greater uniformity in cell performance.

It is yet another object of the present invention to provide specific components and a method of cell construction with such components, in lithium ion polymer cells, which provide enhanced cell performance in addition to overall uniformity of such performance.

Generally the present invention comprises a lithium ion polymer cell in which the separator component is a discrete self supporting element without substrate carrier. The separator comprises a porous non-woven material comprised of polymeric fibers which need not be the same polymer contained in the anode and cathode. The separator is used in its self supporting form, with a minimum thickness of about 1 mil (0.001") and preferably about 25 mils with a substantial weight/unit area of at least about 20 gm/m$^2$ and more preferably about 25–28 gm/m$^2$. The discrete separator may be used without carrier substrate, with the anode and cathode being directly laminated thereon, as with the membrane lamination. Alternatively, the discrete separator is coated on both sides (or coated on one side and allowed to seep to the other side) with a thin layer of the common polymeric material of the anode and cathode whereby it effectively functions as a separator element and a non-removed in situ carrier substrate for a separator of the common polymeric material of the anode and cathode.

A preferred material for the self supporting separator of the present invention is melt blown nonwoven polypropylene commercially available from Johns Manville as Grade material PX0074, having a weight of 28 gm/m2 with a thickness of 0.0025" and a high porosity. Other non woven or fibrous polymeric materials, inert to the cell components may similarly be utilized, such as of PVC, polyethylene and the like or non-polymeric materials such as fibrous glass, glass mat, etc.

In accordance with the present invention, manufacturability is enhanced since the separator can be handled and positioned without a carrier base and the removal thereof, with the material being more rugged. Other manufacturing steps of lamination placement of anode and cathode remain the same. Surprisingly it has beeen found that not only is performance not degraded with the use of a discrete separator of a non-common material but overall cell performance can be actually enhanced, with enhanced uniformity of cell characteristics and structural integrity.

The above and other objects, features and advantages of the present invention will become more evident from the following discussion and the drawings in which:

SHORT DESCRIPTION OF THE DRAWINGS

FIG. 1 is an isometric view of a typical laminated lithium ion battery structure of anode, cathode and separator, as used in the present invention and FIG. 2 is a cross section view taken along line 2—2 of FIG. 1.

DETAILED DESCRIPTION OF THE INVENTION AND THE DRAWINGS

Figure 1:
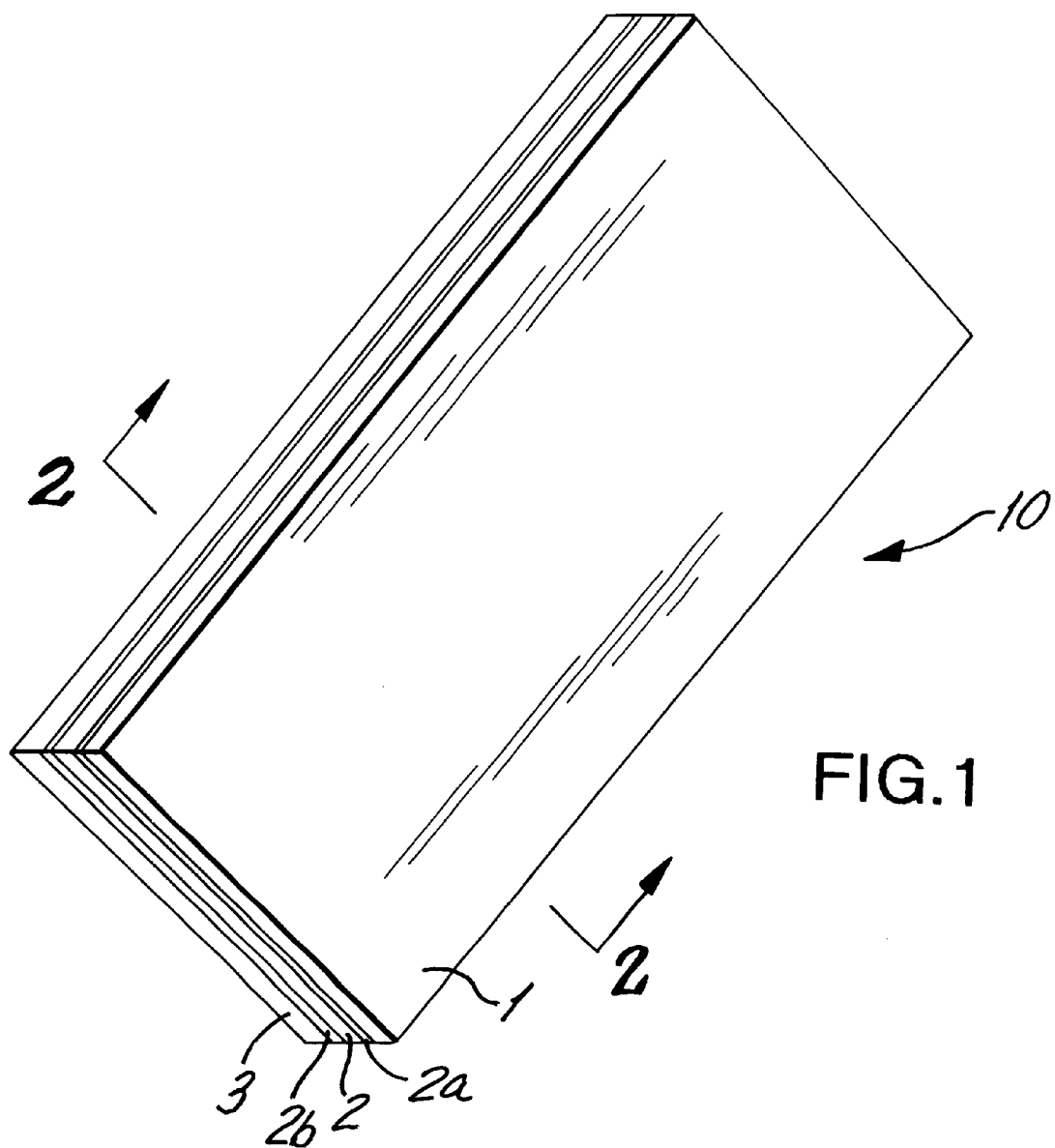
Figure 2:
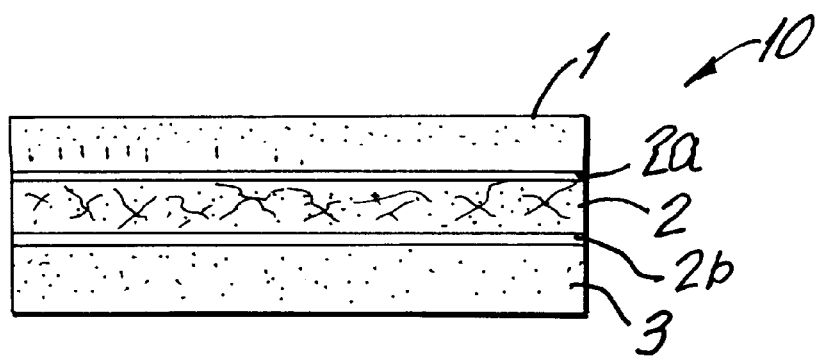

In order to test and demonstrate the efficacy of the present invention two groups of identical prior art lithium ion polymer cells as described in said U.S. Pat. No. 5,296,318, with intercalation carbon anodes and spinel cathodes of $LiMnO_4$ and electrolytes of 1 M $LiPF_6$ in EC-DMC, were identically constructed and tested except that one group (Example 1, with 31 cells) was made with the membrane separators comprised of PVdF copolymer matrix, of the prior art, as specifically described above, on carrier substrates, which were removed during the construction thereof, with lamination of anode and cathode thereto. The other group of cells (Example 2, with 16 cells) was constructed with the Johns Manville grade PX0074 melt blown polypropylene nonwoven, described above, as discrete separators, in place of the substrate carried membrane separator, and coated on both sides with PVdF to an extent sufficient to increase the weight thereof by about 50%, after which the anode and cathode were laminated to the coated separator. As shown in FIGS. 1 and 2, to form cell 10 with anode 1, cathode 3, and separator 2 therebetween, with the PVdF layers 2a and 2b on the separator 2, at the respective interfaces with anode 1 and cathode 3. Both groups of cells were placed under charge regimen of 4.2v constant voltage chage limiting current to a 0.2 A (C rate) until the current fell below C/20 or 2.5 hours to provide a charge profile; and a discharge regimen of constant current discharge at 0.2 A to a 3.0 volt cutoff to provide a discharge regimen. The results of the testing for both groups of cells are given in the following Tables 1 and 2.

EXAMPLE 1

Lithium Ion Polymer Cell without Discrete Separator

TABLE 1

| Cell # | Charge 0 mA Hrs | Discharge 0 mA Hrs | Watt Hr Cyc 0 | Charge 1 mA Hrs | Discharge 1 mA Hrs | Watt Hr Cyc 1 | Efficiency Cycle 0 | OCV After 16 Minutes | OCV After 48 Hrs |
|---|---|---|---|---|---|---|---|---|---|
| 1 | 270.8 | 217.7 | 0.80 | 213.8 | 206.3 | 0.70 | 1.24 | 3.80 | 3.67 |
| 2 | 278.4 | 212.6 | 0.78 | 208.4 | 203.7 | 0.75 | 1.30 | 3.70 | 3.67 |
| 3 | 268.8 | 210.7 | 0.77 | 207.7 | 199.3 | 0.73 | 1.28 | 3.73 | 3.75 |
| 4 | 276.7 | 217.6 | 0.80 | 215.6 | 208.6 | 0.76 | 1.27 | 3.86 | 3.13 |
| 5 | 271.5 | 220.8 | 0.80 | 217.7 | 214.0 | 0.78 | 1.23 | 3.62 | 3.57 |
| 8 | 271.5 | 218.8 | 0.80 | 216.2 | 210.6 | 0.77 | 1.24 | 3.61 | 3.48 |
| 9 | 270.2 | 222.3 | 0.81 | 219.4 | 212.9 | 0.78 | 1.22 | 3.69 | 3.60 |
| 10 | 272.4 | 212.2 | 0.78 | 209.4 | 205.2 | 0.76 | 1.26 | 3.70 | 3.89 |
| 12 | 285.6 | 219.7 | 0.80 | 216.1 | 211.9 | 0.77 | 1.30 | 3.59 | 1.09 |
| 14 | 272.1 | 213.9 | 0.78 | 211.5 | 208.9 | 0.76 | 1.27 | 3.69 | 3.70 |
| 15 | 279.0 | 206.4 | 0.75 | 207.2 | 195.4 | 0.71 | 1.35 | 2.70 | 3.41 |
| 16 | 256.3 | 206.8 | 0.78 | 205.9 | 201.3 | 0.73 | 1.23 | 3.83 | 3.54 |
| 18 | 257.2 | 204.3 | 0.74 | 201.9 | 199.3 | 0.72 | 1.26 | 3.63 | 3.58 |
| 20 | 262.2 | 204.2 | 0.74 | 202.6 | 199.6 | 0.73 | 1.28 | 3.54 | 3.64 |
| 21 | 261.7 | 206.8 | 0.75 | 203.4 | 199.7 | 0.73 | 1.27 | 3.65 | 3.62 |
| 23 | 268.7 | 203.4 | 0.74 | 204.7 | 196.7 | 0.71 | 1.42 | 3.70 | 3.89 |
| 24 | 276.9 | 213.4 | 0.78 | 211.2 | 206.8 | 0.75 | 1.30 | 3.68 | 3.62 |
| 25 | 270.8 | 161.1 | 0.65 | 182.0 | 171.8 | 0.62 | 1.49 | 3.78 | 3.80 |
| 27 | 281.3 | 172.8 | 0.62 | 242.4 | 191.9 | 0.70 | 1.83 | 3.78 | 3.73 |

TABLE 1-continued

| Cell # | Charge 0 mA Hrs | Discharge 0 mA Hrs | Watt Hr Cyc 0 | Charge 1 mA Hrs | Discharge 1 mA Hrs | Watt Hr Cyc 1 | Efficiency Cycle 0 | OCV After 16 Minutes | OCV After 48 Hrs |
|---|---|---|---|---|---|---|---|---|---|
| 28 | 351.9 | 198.0 | 0.72 | 191.1 | 56.0 | 0.21 | 1.76 | 4.00 | 0.48 |
| 31 | 279.7 | 213.3 | 0.77 | 211.8 | 205.8 | 0.75 | 1.31 | 3.62 | 2.44 |
| Average | 276.28 | 208.49 | 0.76 | 209.68 | 195.48 | 0.71 | 1.33 | 3.68 | 9.28 |
| SD | 18.79 | 12.08 | 0.06 | 11.38 | 32.47 | 0.12 | 0.14 | 0.09 | 0.87 |

Charge Profile: 4.2 v Constant Voltage Charge Limiting Current to 0.2 A (C Rate) until Current Falls Below C/20 or 2.6 Hrs
Discharge Profile: Constant Current Discharge at 0.2 A to a 3.0 Volt Cutoff.

EXAMPLE 2

Lithium Ion Polymer Cell with Discrete Separator

TABLE 2

| Cell # | Charge 0 mA Hrs | Discharge 0 mA Hrs | Watt Hr Cyc 0 | Charge 1 mA Hrs | Discharge 1 mA Hrs | Watt Hr Cyc 1 | Efficiency Cycle 0 | OCV After 16 Minutes | OCV After 48 Hrs |
|---|---|---|---|---|---|---|---|---|---|
| 1 | 260.2 | 198.0 | 0.72 | 182.0 | 188.6 | 0.66 | 1.28 | 3.68 | 3.74 |
| 2 | 260.9 | 217.5 | 0.78 | 210.9 | 207.6 | 0.76 | 1.20 | 3.62 | 3.63 |
| 3 | 264.8 | 205.1 | 0.74 | 200.8 | 198.6 | 0.72 | 1.24 | 3.67 | 3.70 |
| 4 | 264.0 | 200.6 | 0.72 | 197.8 | 193.8 | 0.70 | 1.27 | 3.70 | 3.75 |
| 6 | 251.7 | 182.0 | 0.65 | 176.2 | 174.1 | 0.62 | 1.36 | 3.76 | 3.78 |
| 7 | 290.8 | 169.3 | 0.60 | 162.7 | 161.8 | 0.66 | 1.72 | 3.78 | 3.81 |
| 9 | 263.4 | 202.9 | 0.73 | 199.1 | 196.6 | 0.71 | 1.25 | 3.69 | 3.72 |
| 10 | 262.0 | 195.6 | 0.70 | 190.8 | 168.7 | 0.68 | 1.29 | 3.72 | 3.75 |
| 11 | 264.5 | 190.0 | 0.68 | 184.4 | 183.5 | 0.66 | 1.39 | 3.73 | 3.76 |
| 12 | 267.2 | 198.5 | 0.71 | 193.4 | 190.4 | 0.59 | 1.30 | 3.73 | 3.76 |
| 13 | 260.5 | 203.9 | 0.73 | 199.7 | 196.7 | 0.71 | 1.26 | 3.72 | 3.76 |
| 14 | 249.5 | 197.3 | 0.71 | 192.6 | 190.7 | 0.69 | 1.28 | 3.72 | 3.75 |
| 15 | 268.0 | 204.2 | 0.73 | 199.8 | 197.4 | 0.71 | 1.28 | 3.70 | 3.74 |
| 16 | 268.4 | 195.7 | 0.71 | 193.6 | 192.2 | 0.89 | 1.30 | 3.73 | 3.78 |
| Average | 258.34 | 197.41 | 0.71 | 192.42 | 190.06 | 0.08 | 1.31 | 3.71 | 3.74 |
| SD | 9.67 | 10.96 | 0.04 | 11.37 | 10.84 | 0.04 | 0.12 | 0.03 | 0.04 |

Charge Profile: 4.2 v Constant Voltage Charge Limiting Current to 0.2 A (C Rate) until Current Falls Below C/20 or 2.6 Hrs
Discharge Profile: Constant Current Discharge at 0.2 A to a 3.0 Volt Cutoff.

The last column in each Table of OCV after 48 Hrs. is most indicative of cell stability and uniformity of cell performance. The prior art cells generally exhibited declines in OCV voltage or fluctuations whereas the cells utilizing the discrete separators of the present invention exhibited uniform increase in OCV. The use of the discrete separators accordingly provided the benefits of facilitated manufacture as well as greater consistency of performance.

It is understood that the above description and examples are only exemplary of the present invention and that changes may be made to types, number, configuration and composition of the components of the cells of the present invention without departing from the scope of the present invention as defined in the following claims.

What is claimed is:

1. A lithium ion electrochemical cell having an anode and cathode, with each of said anode and cathode containing a polymer and wherein the anode further contains an intercalation carbon material and wherein the cathode contains a material capable of reversibly containing lithium ions, wherein the anode and cathode are laminated on a self supporting discrete separator element, comprised of a porous non-woven material.

2. The cell of claim 1, wherein the self supporting discrete separator element is comprised of a melt blown nonwoven polymer of a thickness in excess of 1 mil.

3. The cell of claim 2, wherein the melt blown nonwoven polymer separator element material is comprised of polypropylene with a unit weight of at least 25 gm/m$^2$.

4. The cell of claim 3, wherein the anode, cathode and separator comprise the same polymer and wherein said same polymer in the separator comprises a coating on the melt blown non-woven polypropylene, with the anode and cathode being laminated on the coating.

5. The cell of claim 1, wherein the self supporting discrete separator is comprised of glass fibers.

* * * * *